UNITED STATES PATENT OFFICE.

HERBERT E. FOWLER, OF NEW HAVEN, AND WILLIAM W. HOLMES, OF WALLINGFORD, CONNECTICUT, ASSIGNORS, BY MESNE ASSIGNMENTS, TO HERBERT E. FOWLER.

IMPROVEMENT IN THE MANUFACTURE OF PLATED SPOONS.

Specification forming part of Letters Patent No. 77,971, dated May 19, 1868; antedated May 4, 1868; Reissue No. 8,979, dated November 25, 1879; application filed May 29, 1879.

*To all whom it may concern:*

Be it known that we, HERBERT E. FOWLER, of New Haven, in the county of New Haven and State of Connecticut, and WILLIAM W. HOLMES, of Wallingford, in the county and State before mentioned, have invented a new and Improved Process in the Manufacture of Tinned Metal Spoons, Forks, and other Articles for Table Use, which improved process is fully set forth in the following specification.

Our invention relates to that class of processes employed in the manufacture of graded metal spoons, forks, and other articles for table use, which are coated with tin; and consists in tinning the sheet-metal blanks for the articles before the operations of grading and forming the articles from the blanks are performed.

Before our invention the operation of tinning was performed after the various articles were formed. The tinning was the last step in the process, and the surface of the tin was too rough and uneven to look well or to be plated with silver or other metal.

In respect to their thickness two kinds of spoons, forks, and other articles for table use are known to the public, their difference consisting in their equal or unequal thickness. Spoons, for example, of equal thickness throughout their length are punched from sheet metal, and are called "sheet-metal spoons." Spoons of unequal thickness, having the narrow parts of their handles made thicker than their other parts, are made from cast-metal or sheet-metal blanks, and are called "graded spoons."

To enable others skilled in the art to which our invention belongs to use our improved process, we will describe it in detail.

The blanks for spoons, forks, and other articles are punched from sheet iron or steel into the required form in the usual and well-known way by punches and dies arranged in a press common for the purpose.

The blanks are of the thickness required in the thickest part of the handle of the article to be made, and are similar in form to the cast blanks used in the manufacture of silver spoons. The blanks are then tinned by the usual and well-known process of tinning articles made of iron and steel. The blank, whether it be for a spoon, fork, knife, or other article for table use, is then fashioned and finished by rolls or dies formed for the particular article. The dies planish the surface of the tin on the article during the operation of forming, and make it smooth and even.

Articles for table use made from these tinned blanks have a far better appearance than the same articles made in the ordinary way, are more valuable for use as tinned articles, and are smooth and even enough to be plated with silver or other metal.

We claim as our invention—

The herein-described improvement in the process of manufacturing tinned and graded metal spoons, forks, and other articles for table use, consisting in punching the blanks from sheet metal, and in tinning the blanks before the operations of forming the articles from the blanks are performed, substantially as set forth.

HERBERT E. FOWLER.
WILLIAM W. HOLMES.

Witnesses:
GEORGE TERRY,
DANL. S. GLENNEY, Jr.